United States Patent
Miyashita (10) Patent No.: US 8,350,993 B2
(45) Date of Patent: Jan. 8, 2013

(54) LCD APPARATUS

(75) Inventor: Takashi Miyashita, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 414 days.

(21) Appl. No.: 12/687,079

(22) Filed: Jan. 13, 2010

(65) Prior Publication Data

US 2010/0182549 A1    Jul. 22, 2010

(30) Foreign Application Priority Data

Jan. 20, 2009   (JP) .................... 2009-009417

(51) Int. Cl.
G02F 1/1335 (2006.01)
G02F 1/1333 (2006.01)
(52) U.S. Cl. ...................... 349/106; 349/110
(58) Field of Classification Search .......... 349/106, 349/110
See application file for complete search history.

(56) References Cited

U.S. PATENT DOCUMENTS

2006/0082721 A1* 4/2006 Okumoto et al. ............ 349/197
2007/0008463 A1* 1/2007 Tanaka et al. ................ 349/107

FOREIGN PATENT DOCUMENTS

| JP | 9-197445 A | 7/1997 |
| JP | 2001-255409 A | 9/2001 |
| JP | 2006-119270 A | 5/2006 |
| JP | 2007-041551 A | 2/2007 |
| JP | 2007-127879 A | 5/2007 |
| JP | 2008-096514 A | 4/2008 |

OTHER PUBLICATIONS

Japanese Office Action in counterpart application JP2009-009417, dated Dec. 7, 2010, citing Foreign Patent document Nos. 1-2 listed above and JP2007-041551.
Japanese Office Action dated Sep. 6, 2011, in a counterpart Japanese patent application No. 2009-009417, citing Foreign Patent document Nos. 1-2 above.

* cited by examiner

*Primary Examiner* — Nathanael R Briggs
(74) *Attorney, Agent, or Firm* — Chen Yoshimura LLP (57) ABSTRACT

A liquid crystal display apparatus includes a plurality of color filters for four color components arranged in a matrix correspondingly to a plurality of pixels, respectively, every group of four color filters that are arranged adjacently in horizontal and vertical directions being corresponding to different four color components, wherein each of the plurality of color filters has a generally rectangular shape that has a cutout portion in each of four corners thereof.

17 Claims, 10 Drawing Sheets

| R | G | B | W | R | G | B | W |
|---|---|---|---|---|---|---|---|
| B | W | R | G | B | W | R | G |
| R | G | B | W | R | G | B | W |

LCD APPARATUS

CROSS-REFERENCE TO RELATED APPLICATIONS

This application is based upon and claims the benefit of priority from the prior Japanese Patent Application No. 2009-009417, filed Jan. 20, 2009, the entire contents of which are hereby incorporated by reference.

BACKGROUND OF THE INVENTION

1. Field of the Invention

The invention relates to liquid crystal display (LCD) apparatus that is provided with color filters.

2. Description of the Related Art

In liquid crystal display (LCD) apparatus, in order to perform color display, color filters corresponding to the prescribed color components are formed in respective pixels. As the color components, red, green and blue—the three primary colors—have been used. The color filter of the red component, the color filter of the green component and the color filter of the blue component are respectively formed in that order with respect to three pixels that are arranged successively. The LCD apparatus performs color display using these three pixels as a unit. The respective color filters are formed by patterning appropriate photosensitive color resists in turn.

In the meanwhile, recently, a sub-pixel rendering technology that achieves a pseudo high resolution display using a relatively small number of pixels has been developed. In the sub-pixel rendering technology, a white color component is added to the three primary colors of red, green and blue. For example, as shown in FIG. 12, the color filters corresponding to the respective color components are formed sequentially in four pixels that are located successively in a row, and the color filters are formed such that the same color components are shifted in position by two pixels between the adjacent two rows of pixels.

Figure 12:
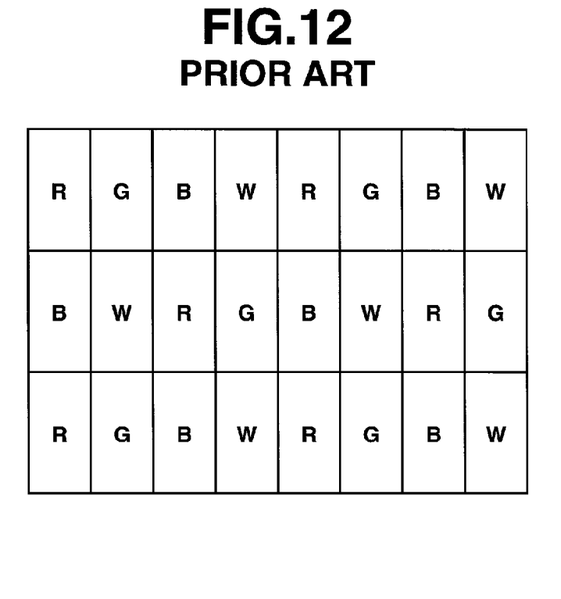
FIG. 12 is a layout drawing of the color filters of the respective color components in the conventional art.
Figure 13A:
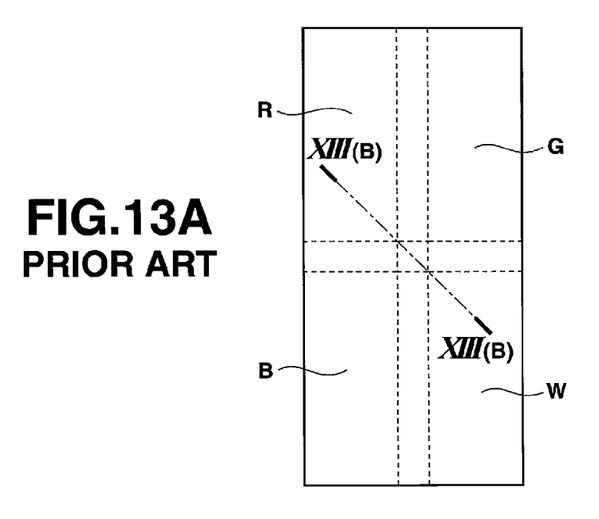
FIG. 13A is a plan view depicting the respective color filters when a misalignment occurs in the conventional art.
Figure 13B:
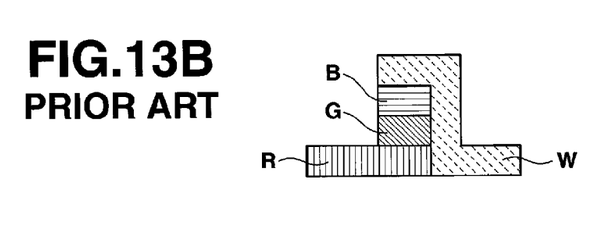
FIG. 13B is a cross-section view taken along the line A-A' of FIG. 13A.

When the respective color components are arranged as shown in FIG. 12, the four pixels that are adjacently located vertically and horizontally have four different color components. Accordingly, when the color filters for the respective color components are patterned in turn and when a misalignment and the like occur, as shown in FIGS. 13A and 13B, three or more of color filters may be overlapped at certain corners of the respective pixels (the maximum of four color filters may overlap). When such overlap occurs, because of the large difference between the thickness of the overlapped portions and that of the single color filter that is not overlapped, the injected liquid crystal layer may not achieve its target thickness, thereby causing a thickness error in the liquid crystal layer.

SUMMARY OF THE INVENTION

The present invention aims to provide LCD apparatus that can prevent the thickness error of the liquid crystal layer, even when the color filters corresponding to mutually different color components are formed in the adjacent four pixels.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present invention provide a liquid crystal display apparatus including a plurality of color filters for four color components arranged in a matrix correspondingly to a plurality of pixels, respectively, every group of four color filters that are arranged adjacently to each other in a first direction and in a second direction that is perpendicular to the first direction being corresponding to different four color components, wherein each of the plurality of color filters has an outer shape that has a cutout portion in each of four corners thereof, wherein the liquid crystal display apparatus further comprises a light shielding film formed in a grid shape with a plurality of first lines extending in the first direction and a plurality of second lines extending in the second direction, the light shielding film shielding edge portions of each color filter, wherein $Ps \geqq Gs$, $Las = Bs - ((Ps-Gs)/2)$, and $Ps - Gs \leqq 2 \cdot Bs$ are satisfied, where a pitch of the pixels in the first direction is defined as Ps, a maximum width of the color filters in the first direction is defined as Gs, a line width of the second lines is defined as Bs, and a maximum width of the cutout portions of each color filter in the first direction is defined as Las, and wherein $Pd \geqq Gd$, $Lad = Bd - ((Pd-Gd)/2)$, and $Pd - Gd \leqq 2 \cdot Bd$ are satisfied, where a pitch of the pixels in the second direction is defined as Pd, a maximum width of the color filters in the second direction is defined as Gd, a line width of the first lines is defined as Bd, and a maximum width of the cutout portions of each color filter in the second direction is defined as Lad.

In another aspect, the present invention provides a liquid crystal display apparatus including a first color filter for a first color component disposed in a first pixel; a second color filter for a second color component disposed in a second pixel that is located adjacent to the first pixel in a row direction; a third color filter for a third color component disposed in a third pixel that is located adjacent to the first pixel in a column direction; and a fourth color filter for a fourth color component disposed in a fourth pixel that is located adjacent to the second pixel in the column direction and adjacent to the third pixel in the row direction, wherein the first color filter has a shape in which a corner adjacent both to the second pixel and to the third pixel is cut off from a pixel shape of the first pixel, wherein the second color filter has a shape in which a corner adjacent both to the first pixel and to the fourth pixel is cut off from a pixel shape of the second pixel, wherein the third color filter has a shape in which a corner adjacent both to the first pixel and to the fourth pixel is cut off from a pixel shape of the third pixel, wherein the fourth color filter has a shape in which a corner adjacent both to the second pixel and to the third pixel is cut off from a pixel shape of the fourth pixel, wherein the liquid crystal display apparatus further includes a light shielding film formed in a grid shape with a plurality of first lines extending in the column direction and a plurality of second lines extending in the row direction, the light shielding film shielding edge portions of each color filter, wherein $Ps \geqq Gs$, $Las = Bs - ((Ps-Gs)/2)$, and $Ps - Gs \leqq 2 \cdot Bs$ are satisfied, where a pitch of the pixels in the column direction is defined as Ps, a maximum width of the color filters in the column direction is defined as Gs, a line width of the second lines is defined as Bs, and a maximum width of the cutout portions of each color filter in the column direction is defined as Las, and wherein $Pd \geqq Gd$, $Lad = Bd - ((Pd-Gd)/2)$, and $Pd - Gd \leqq 2 \cdot Bd$ are satisfied, where a pitch of the pixels in the row direction is defined as Pd, a maximum width of the color filters in the row direction is defined as Gd, a line width of the first lines is defined as Bd, and a maximum width of the cutout portions of each color filter in the row direction is defined as Lad.

In another aspect, the present invention provides a liquid crystal display apparatus including a first color filter for a first color component disposed in a first pixel; a second color filter for a second color component disposed on a second pixel that is located adjacent to the first pixel in a row direction; a third color filter for a third color component disposed in a third pixel that is located adjacent to the first pixel in a column direction; and a fourth color filter for a fourth color component located in a fourth pixel that is located adjacent to the second pixel in the column direction and adjacent to the third pixel in the row direction, wherein the first through fourth color filters are shaped so as to leave an area surrounded by the first, second, third and fourth color filters that is unoccupied by any of the first through fourth color filters, wherein the liquid crystal display apparatus further includes a light shielding film formed in a grid shape with a plurality of first lines extending in the column direction and a plurality of second lines extending in the row direction, the light shielding film shielding edge portions of each color filter, wherein $Ps \geq Gs$, $Las=Bs-((Ps-Gs)/2)$, and $Ps-Gs \leq 2 \cdot Bs$ are satisfied, where a pitch of the pixels in the column direction is defined as Ps, a maximum width of the color filters in the column direction is defined as Gs, a line width of the second lines is defined as Bs, and a maximum width of the cutout portions of each color filter in the column direction is defined as Las, and wherein $Pd \geq Gd$, $Lad=Bd-((Pd-Gd)/2)$, and $Pd-Gd \leq 2 \cdot Bd$ are satisfied, where a pitch of the pixels in the row direction is defined as Pd, a maximum width of the color filters in the row direction is defined as Gd, a line width of the first lines is defined as Bd, and a maximum width of the cutout portions of each color filter in the row direction is defined as Lad.

According to these aspects of the present invention, even when the color filters corresponding to the mutually different color components are formed in the adjacent four pixels, an occurrence of the thickness error of the liquid crystal layer can be prevented.

It is to be understood that both the foregoing general description and the following detailed description are exemplary and explanatory, and are intended to provide further explanation of the invention as claimed.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Exemplary embodiments for implementing the present invention will now be described with reference to the drawings.

Figure 1:
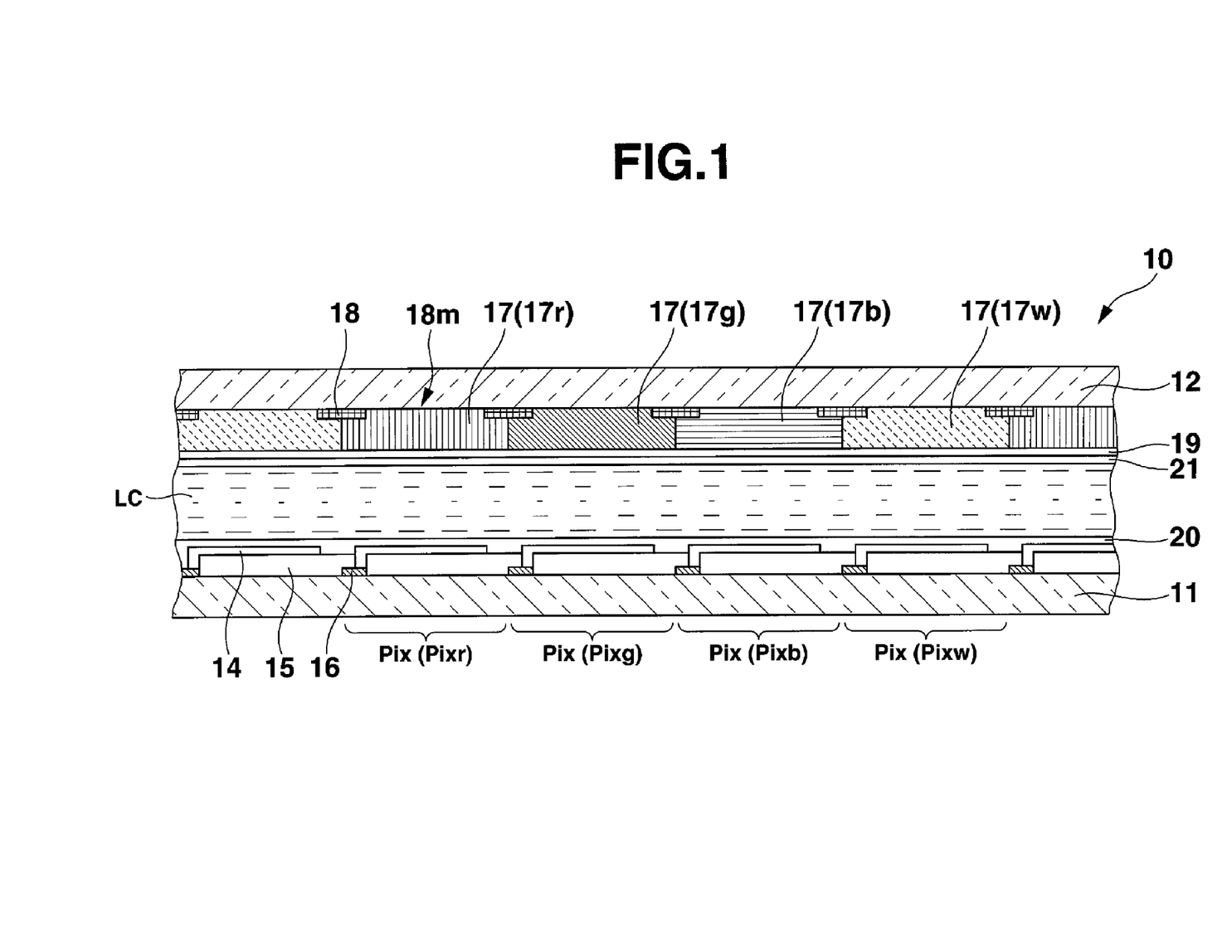
FIG. 1 is a cross-section view showing a principal part of an LCD apparatus according to an exemplary embodiment of the invention.
Figure 2:
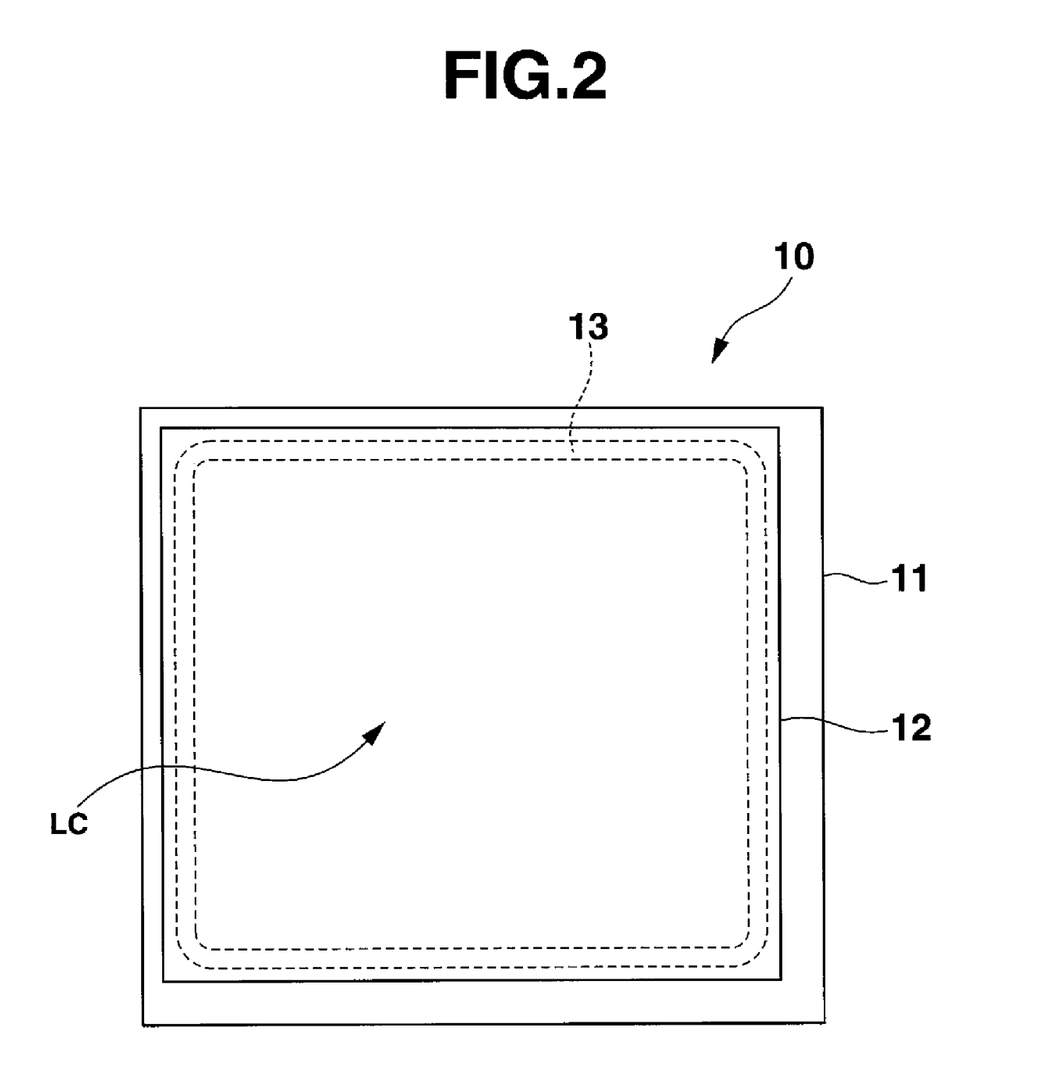
FIG. 2 is an explanatory figure for a shape of a seal material in plan view.

In an LCD apparatus 10 made according to an embodiment of the invention, as shown in FIG. 1, a first substrate 11 and a second substrate 12 that are composed of a transparent material such as a glass and the like are arranged so as to face each other through a liquid crystal layer LC. As shown in FIG. 2, the first substrate 11 and the second substrate 12 are bonded to each other with a seal material 13 that is in an approximately rectangular frame shape. The liquid crystal layer LC is formed by encapsulating a liquid crystal in a region surrounded by the seal material 13. The liquid crystal layer LC is set up at a layer thickness of, for example, 4.0 μm.

In FIG. 1, on a surface of the first substrate 11 facing the second substrate 12, pixel electrodes 14 that are composed of a transparent conductive film (ITO film, etc.) are formed in respective pixels Pix. The respective pixel electrodes 14 are electrically connected to thin film transistors (TFTs) 16, which are located on a lower layer side than the pixel electrodes 14 as switching elements, via insulation films 15. In addition, on an upper layer side (the liquid crystal layer side) of the pixels electrodes 14, an orientation film 20 that prescribes the initial orientation state of liquid crystal molecules in the liquid crystal layer LC is formed so as to cover the pixel electrodes 14.

Figure 3:
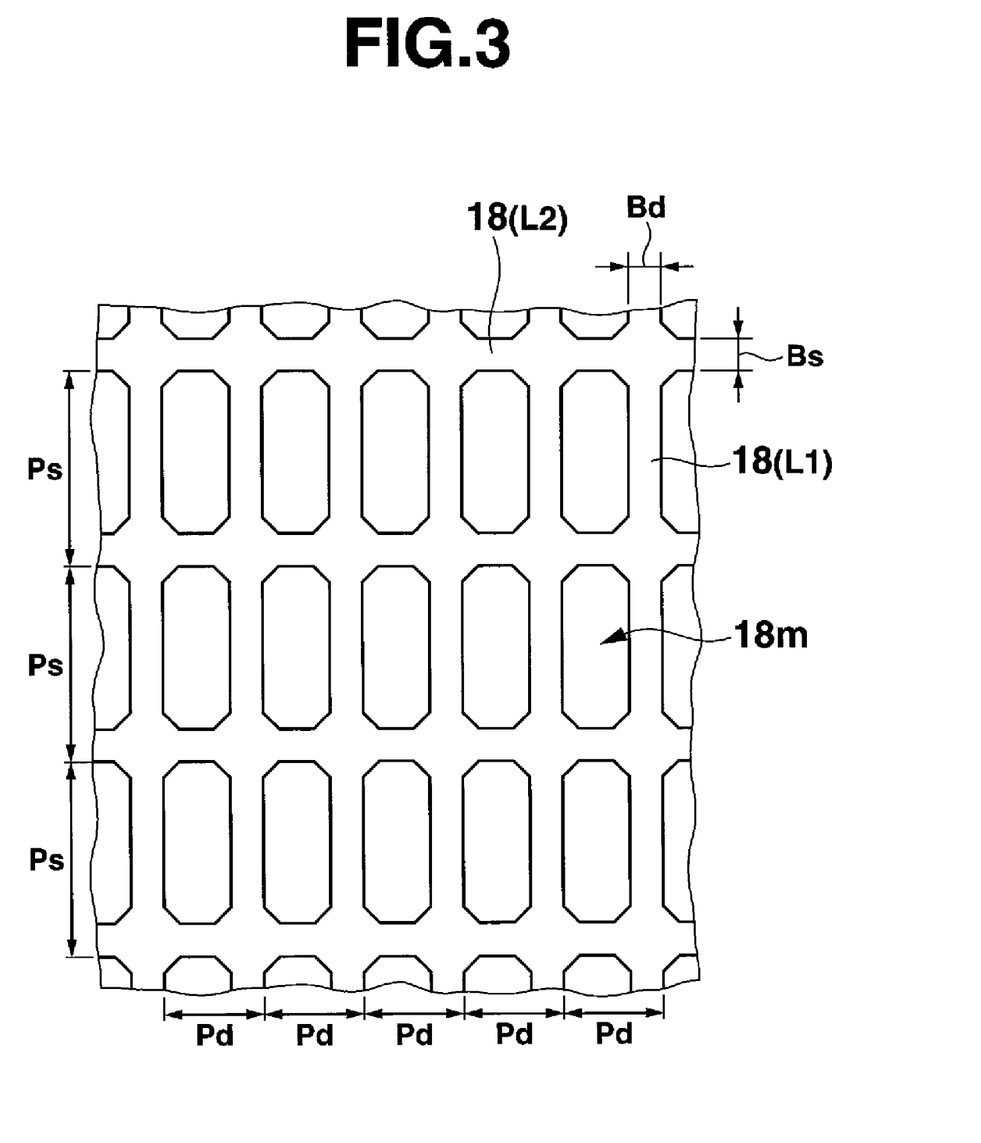
FIG. 3 is an explanatory figure for a shape of a light shielding film in plan view.

Meanwhile, on a surface of the second substrate 12 facing the first substrate 11, as shown in FIG. 3, a light shielding film 18 is formed as a grid-like black matrix so that openings 18m thereof correspond to respective positions of the pixel electrodes 14. On an upper layer side of the light shielding film 18, color filters 17 for the prescribed color components are formed for the respective pixels Pix.

Figure 4:
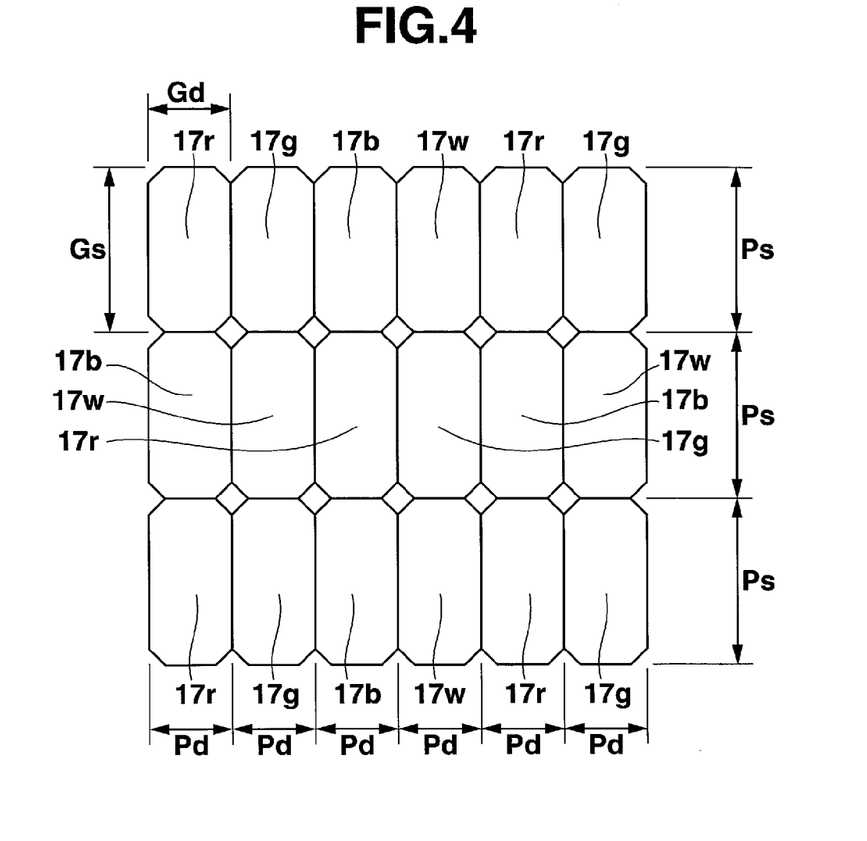
FIG. 4 is a layout drawing of color filters of the respective color components diagram according to an exemplary embodiment of the invention.

Specifically, as shown in FIG. 4, a color filter of red component 17r, a color filter of green component 17g, a color filter of blue component 17b and a color filter of white component 17w are arranged in that order in successive four pixels Pix disposed in a row, and theses four color filters are repeated every four pixels. Between the adjacent two rows, the same color components are shifted by two pixels. That is, a pixel Pixr in which the color filter of red component 17r is formed displays a brightness based upon the pixel data corresponding to the red component, a pixel Pixg in which the color filter of green component 17g is formed displays a brightness based upon the pixel data corresponding to the green component, a pixel Pixb in which the color filter of blue component 17b is formed displays a brightness based upon the pixel data corresponding to the blue component, and a pixel Pixw in which the color filter of white component 17w is formed displays a brightness based upon the pixel data corresponding to the white component.

As shown in FIG. 3, in the light shielding film 18, among grid lines that form the respective grids, grid lines L1 that extend in the direction of pixel columns (i.e., in the vertical direction) have a prescribed width Bd. Grid lines L2 that extend in the direction of pixel rows (i.e., in the horizontal direction) have a prescribed width Bs.

Figure 5:
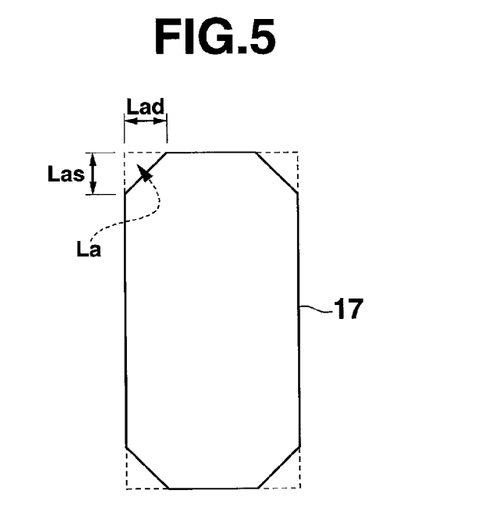
FIG. 5 is an explanatory plan view of a shape of the respective color filters according to the exemplary embodiment of the invention.

In addition, the color filters 17 in the respective pixels Pix are formed so that the outline thereof has a generally rectangular shape with each of the four corners being cut off (e.g., octagon shape). Specifically, the respective color filters 17 are formed so that the width Gs in the vertical direction (the largest width in the vertical direction) is equal to the vertical pitch Ps of the pixels that are arranged in the vertical direction. Similarly, the respective color filters 17 are formed so that the width Gd in the horizontal direction (the largest width in the horizontal direction) is equal to the horizontal pitch Pd of the pixels that are arranged in the horizontal direction. Furthermore, as shown in FIG. 5, in this example, the side Lad of the cutout section La, which forms a right triangular, in the horizontal direction (the largest width in the horizontal direction of the cut-out portion La of the color filter), is set to be equal to the width Bd of the grid lines L1, and the side Las of the cutout section La in the vertical direction (the largest width in the vertical direction of the cut-out portion La of the color filter) is set to be equal to the width Bs of the grid lines L2.

Turning to FIG. 1, on the upper layer side (on the liquid crystal layer side) of the respective color filters 17, a common electrode 19, which receives a voltage common to all of the pixels Pix, is formed. In addition, on the upper layer side of the common electrode 19, similarly to the surface of the first substrate 11, an orientation film 21 that prescribes an initial orientation state of liquid crystal molecules in the liquid crystal layer LC is formed.

A method for forming the respective layers on the second substrate 12 will now be described in more detail with reference to FIGS. 6A-6L.

Figure 6A:
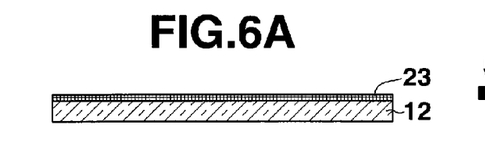
FIG. 6A is an explanatory figure for a method of forming various layers on a second substrate, and shows a state in which a metal film is formed on the second substrate.
Figure 6B:
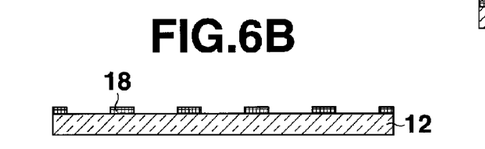
FIG. 6B is an explanatory figure for the method of forming various layers on the second substrate, and shows a state in which the metal film is patterned as the light shielding film.

At first, a metal film 23, such as an aluminum alloy, chromium or the like, is formed on the second substrate 12 using a sputtering method in a thickness of 0.1 μm, for example (FIG. 6A). Then, by patterning the metal film 23 by photolithography using a photo resist, the above-described light shielding film 18 is formed (FIG. 6B).

Figure 6C:
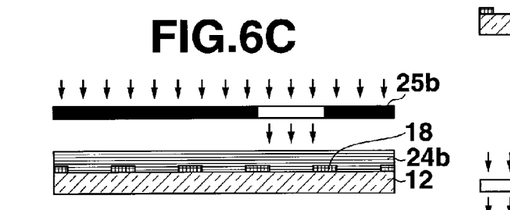
FIG. 6C is an explanatory figure for the forming method of the various layers on the second substrate, and shows a state in which an exposure of a blue color resist is being conducted.
Figure 6D:
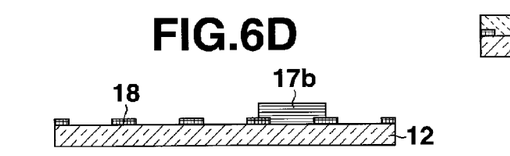
FIG. 6D shows the forming method of the respective layers on the second substrate and shows a state that the blue resist is patterned as a color filter of blue component.

Next, a blue color resist 24b with a blue pigment is applied by spin coating so as to cover the light shielding film 18 in a thickness of 1.5 μm, for example, and parts of the blue color resist 24b that are at positions corresponding to the pixels Pixb for the blue component are exposed by using a photo mask 25b having a prescribed pattern (FIG. 6C). Then, the color filters of blue component 17b are formed by developing the exposed blue color resist 24b with a prescribed developer (FIG. 6D).

Figure 6E:
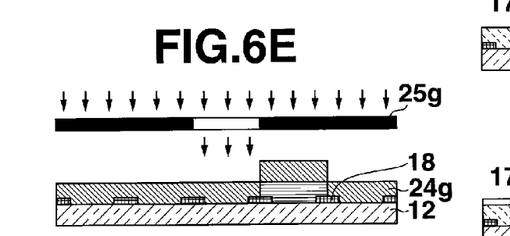
FIG. 6E shows the forming method of the respective layers on the second substrate and shows a state in which an exposure of a green color resist is being conducted.
Figure 6F:
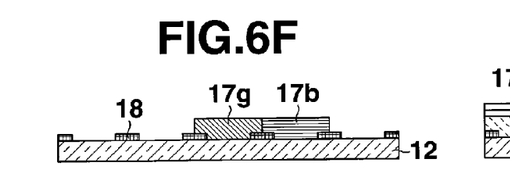
FIG. 6F shows the forming method of the respective layers on the second substrate and shows a state that the green resist is patterned as a color filter of green component.

Next, a green color resist 24g with a green pigment is applied by spin coating so as to cover the light shielding film 18 in a thickness of 1.5 μm, for example, and parts of the green color resist 24g that are at positions corresponding to the pixels Pixg for the green component are exposed by using a photo mask 25g having a prescribed pattern (FIG. 6E). Then, the color filters of green component 17g are formed by developing the green color resist 24g with a prescribed developer (FIG. 6F).

Figure 6G:
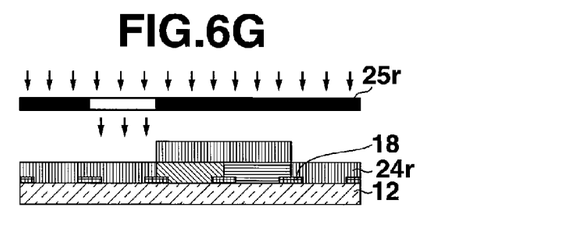
FIG. 6G shows the forming method of the respective layers on the second substrate and shows a state in which an exposure of a red color resist is being conducted.
Figure 6H:
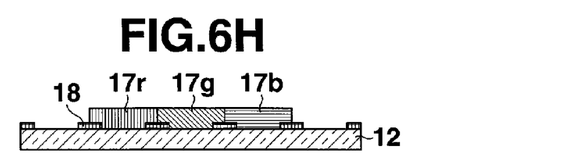
FIG. 6H shows the forming method of the respective layers on the second substrate and shows a state that the red color resist is patterned as a color filter of red component.

Next, a red color resist 24r with a red pigment is applied by spin coating so as to cover the light shielding film 18 in a thickness of 1.5 μm, for example, and parts of the red color resist 24r that are at positions corresponding to the pixels Pixr for the red component are exposed by using a photo mask 25r having a prescribed pattern (FIG. 6G). Then, the color filters of red component 17r are formed by developing the red color resist 24r with a prescribed developer (FIG. 6H).

Figure 6I:
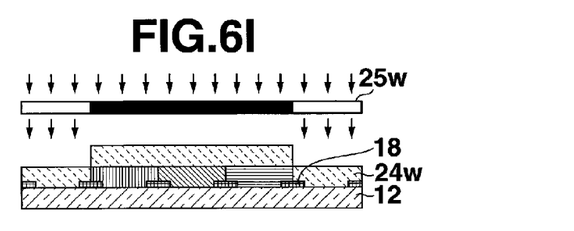
FIG. 6I shows the forming method of the respective layers on the second substrate and shows a state in which an exposure of a white color resist is being conducted.
Figure 6J:
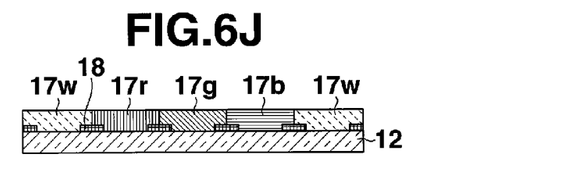
FIG. 6J shows the forming method of the respective layers on the second substrate and shows a state that the white color resist is patterned as a color filter of white component.

Next, a resist 24w, which is clear and colorless in the visual light range with no pigments (hereinafter referred to as a white color resist 24w for convenience), is applied by spin coating so as to cover the light shielding film 18 in a thickness of 1.5 μm, for example, and parts of the white color resist 24 that are at positions corresponding to the pixels Pixw for the white component are exposed by using a photo mask 25w having a prescribed pattern (FIG. 6I). Then, the color filters of white component 17w are formed by developing the white color resist 24w with a prescribed developer (FIG. 6J).

As a matter of design, the color filters 17 for the respective color components are formed on the light shielding film 18 such that the boundaries of the adjacent color filters 17—that is, the edge portions of the respective color filters 17—are located at the center of the grid lines L1, L2. In this case, by prescribing the above-described relationship among various dimensions Bd, Bs, Gd, Gs of the grid lines L1, L2 and color filters 17, respectively, even if one or more of the color filters 17 are misaligned relative to the light shielding film 18 up to a half of the widths of the grid lines L1, L2, respectively, due to an alignment error or the like, adverse impact on display quality, such as a color deviation and the like, can be substantially prevented.

Furthermore, by forming the outline of the respective color filters 17 to be a generally rectangular shape with the four corners being cut off as described above (e.g., octagon shape), even if different amounts of misalignment occur for the respective color filters 17 relative to the light shielding film 18, if the misalignment is within the range of the above-described tolerance, an overlap of three or four of the color filters 17*r*, 17*g*, 17*b*, 17*w* at the corners can be prevented. Thus, the thickness error of the liquid crystal layer due to the excessive overlap of the color filters can also be effectively prevented.

Figure 7:
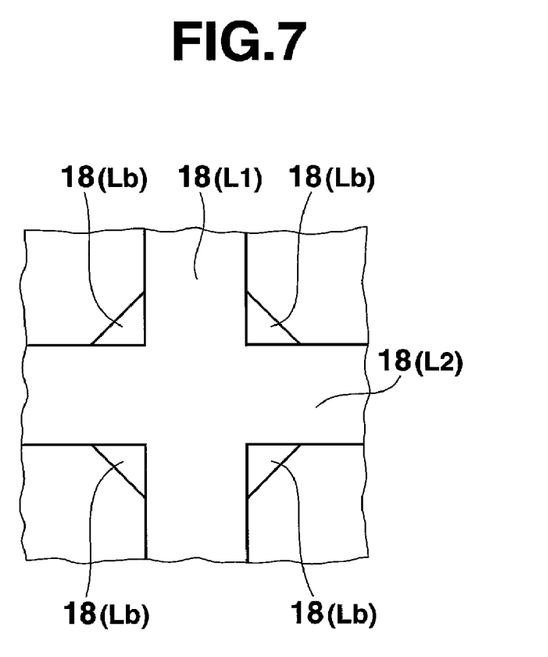
FIG. 7 is a plan view of supplemental light shielding parts according to an exemplary embodiment of the invention.

Here, as shown in FIG. 3 and FIG. 7, at the respective intersections of the grid lines L1 and the grid lines L2 of the light shielding film 18, it is preferable to form supplemental shielding sections Lb whose shape corresponds to that of the cutoff sections La of the respective color filters 17. In this case, if the misalignment is within the range of the above-described tolerance, it is possible to avoid creating areas of no color filter inside the openings 18*m* of light shielding film 18. Therefore, adverse impact on display quality, such as the color deviation and the like, due to the cut-out portions can be further prevented.

Figure 6K:
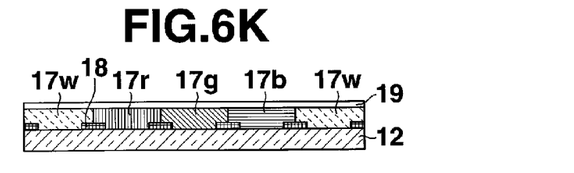
FIG. 6K shows the forming method of the respective layers on the second substrate and shows a state of having formed an ITO layer on the color filters for the respective color components as a common electrode.

On the color filters 17 of the respective color components, an ITO film that is used as the common electrode 19 is formed by sputtering so as to cover the respective color filters 17 in a thickness of 0.1 µm, for example (FIG. 6K). In this case, it is preferable to form the ITO by sputtering through a deposition mask, which has an opening corresponding to the entire display area and has a shielding portion corresponding to the non-display area, without using photolithography.

Figure 6L:
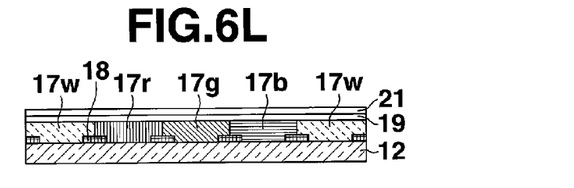
FIG. 6L shows the forming method of the respective layers on the second substrate and shows a state that an orientation film is applied on the common electrode.

Then, an orientation film 21 is coated on the common electrode 19 by a press printing method so as to cover the common electrode 19 in a thickness of 50 nm, for example (FIG. 6L).

Figure 8A:
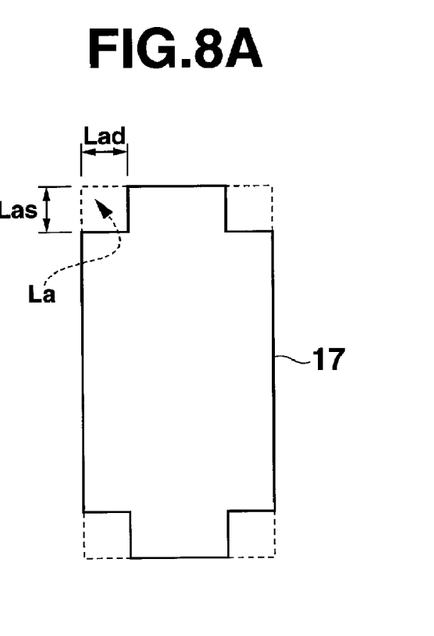
FIG. 8A is a plan view of an exemplary variation for a shape of cutout sections according to an exemplary embodiment of the invention.
Figure 8B:
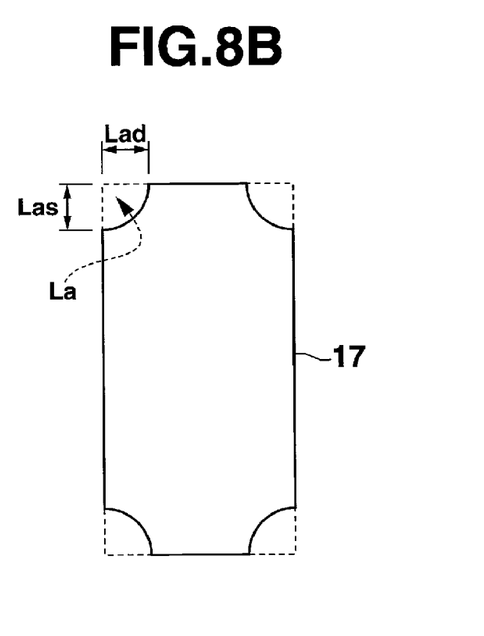
FIG. 8B is a plan view of another exemplary variation for the shape of the cutout sections according to an exemplary embodiment of the invention.

In the above-described exemplary embodiment, a structure in which the color filters 17 have cutout sections La of a right triangle is described. Alternatively, the respective cutout sections La may substantially take the shape of a square or the like, as shown in FIG. 8A. Also, the respective cutout sections La may be in the shape of a quarter sector, as shown in FIG. 8B. In addition, the respective cutout sections La can take different shapes, respectively.

In the above-described exemplary embodiments, the structure in which the width Gs in the vertical direction of the respective color filters 17 is equal to the vertical pitch Ps of the pixels arranged in the vertical direction is described. However, the width Gs in the vertical direction of the respective color filters 17 can be set to be narrower than the pitch Ps of the pixels arranged in the vertical direction. In such a case, because spaces are provided between the adjacent color filters in the vertical direction in order to maintain the pitch for the alignment in the vertical direction of the color filters, it is preferable that the outline width Las in the vertical direction of the cutout section La be narrower than the width Bs of the grid lines L2 by an amount that reflects a difference between the width Gs in the vertical direction of the respective color filters 17 and the vertical pitch Ps of the pixels arranged in the vertical direction. For example, it is preferable for the outline width Las to satisfy the following formula.

$$Las=Bs-((Ps-Gs)/2), \text{ where } Ps-Gs \leq 2 \cdot Bs$$

In addition, in the above-described exemplary embodiments, the structure in which the width Gd in the horizontal direction of the respective color filters 17 is equal to the horizontal pitch Pd of the pixels arranged in the horizontal direction is described. However, the width Gd in the horizontal direction of the respective color filters 17 can be set to be narrower than the horizontal pitch Pd of the pixels arranged in the horizontal direction. In such a case, it is preferable that the outline width Lad in the horizontal direction of the cutout section La be made narrower than the width Bd of the grid lines L1 by an amount that reflects a difference between the width Gd in the horizontal direction of the color filters 17 and the horizontal pitch Pd of the pixels arranged in the horizontal direction. For example, it is preferable for the outside width Lad to satisfy the following formula.

$$Lad=Bd-((Pd-Gd)/2), \text{ where } Pd-Gd \leq 2 \cdot Bd$$

Other empirically or theoretically determined relationships among these dimensions may also be appropriate depending on particular needs and other factors, such as the shape of pixel electrodes, the shape of pixels, and the areas occupied by TFTs.

The above-described exemplary embodiments had a structure in which the thickness of each color filter is the same among the color filters 17 for various color components and in which the thickness of the liquid crystal layer is substantially the same under the respective color components. Alternatively, the thickness of the liquid crystal layer may be made to differ among the color components. That is, because the birefringence of liquid crystal differs with light wavelengths, by adjusting the thickness of the liquid crystal layer by appropriately setting the thickness of color filters and/or the thickness of transparent films, the pixels can be formed so that the retardation (a product of the birefringence of liquid crystal and the thickness of liquid crystal) of the liquid crystal becomes equal among the pixels of the different color components.

Figure 9:
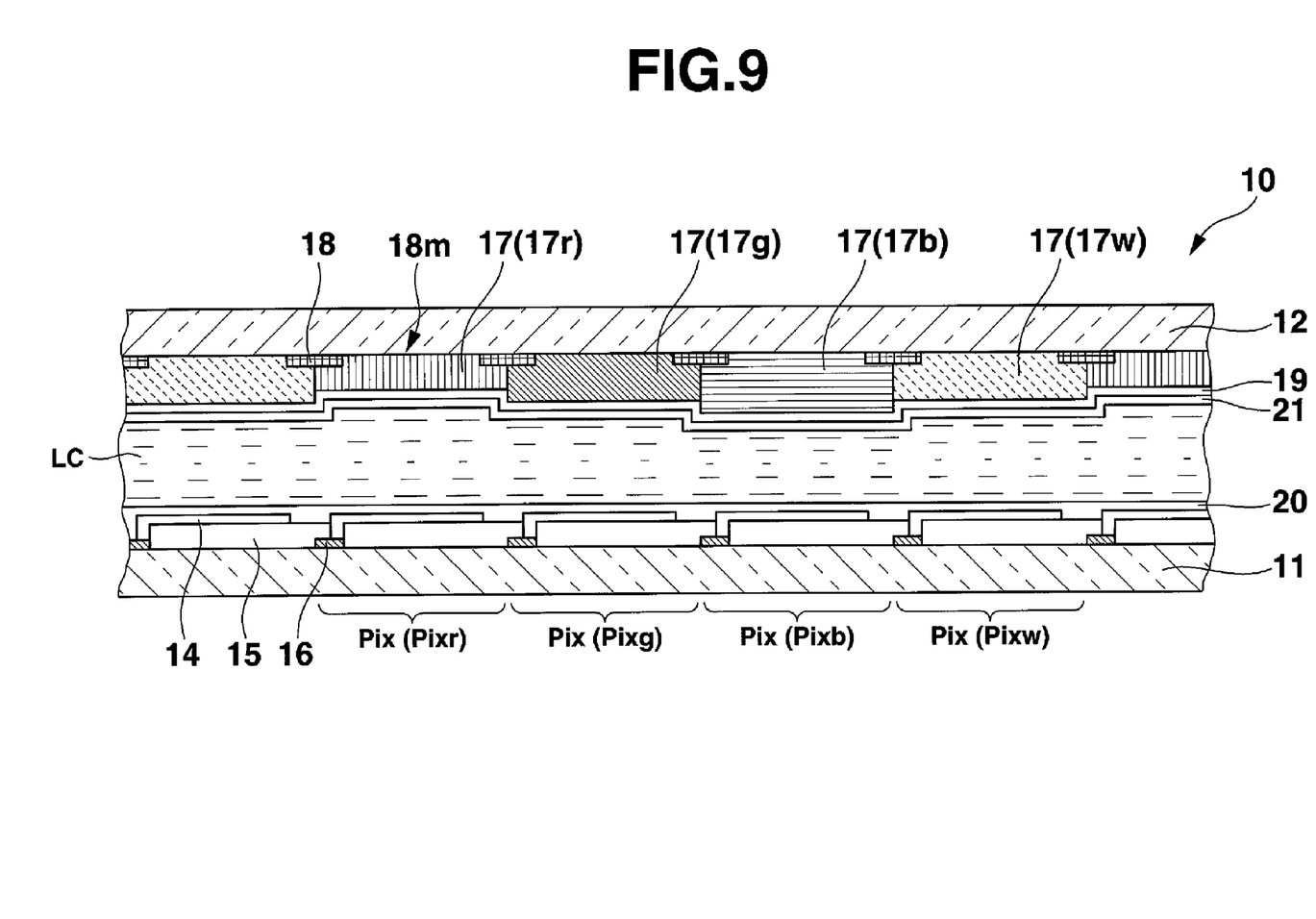
FIG. 9 is a cross-section view of an LCD apparatus according to an exemplary embodiment of the invention.

For example, as a first exemplary variation of the above-described structure, when the birefringence of the liquid crystal becomes larger for shorter wavelengths in the visual light range and becomes smaller for longer wavelength, as shown in FIG. 9, the respective thicknesses of the color filters of red component 17*r*, the color filters of green component 17*g* and the color filters of blue component 17*b* can be formed such that that the corresponding thickness of the liquid crystal layer LC becomes thinner in the order of the pixel Pixr corresponding to the red component, the pixel Pixg corresponding to the green component and the pixel Pixb corresponding to the blue component. That is, the thickness of the corresponding color filter becomes thicker in the ascending order of the color filter of red component 17*r*, the color filter of green component 17*g* and the color filter of blue component 17*b*. In this case, it is preferable that the pixel Pixw for the white component is formed so that the thickness of the liquid crystal layer therein becomes equal to that of the liquid crystal layer in the pixel Pixg corresponding to the green component, which is the color component to which human eyes are most sensitive. Thus, it is preferable that the thickness of the color filters of white component 17*w* be equal to that of the color filter of green component 17*g*.

Figure 10:
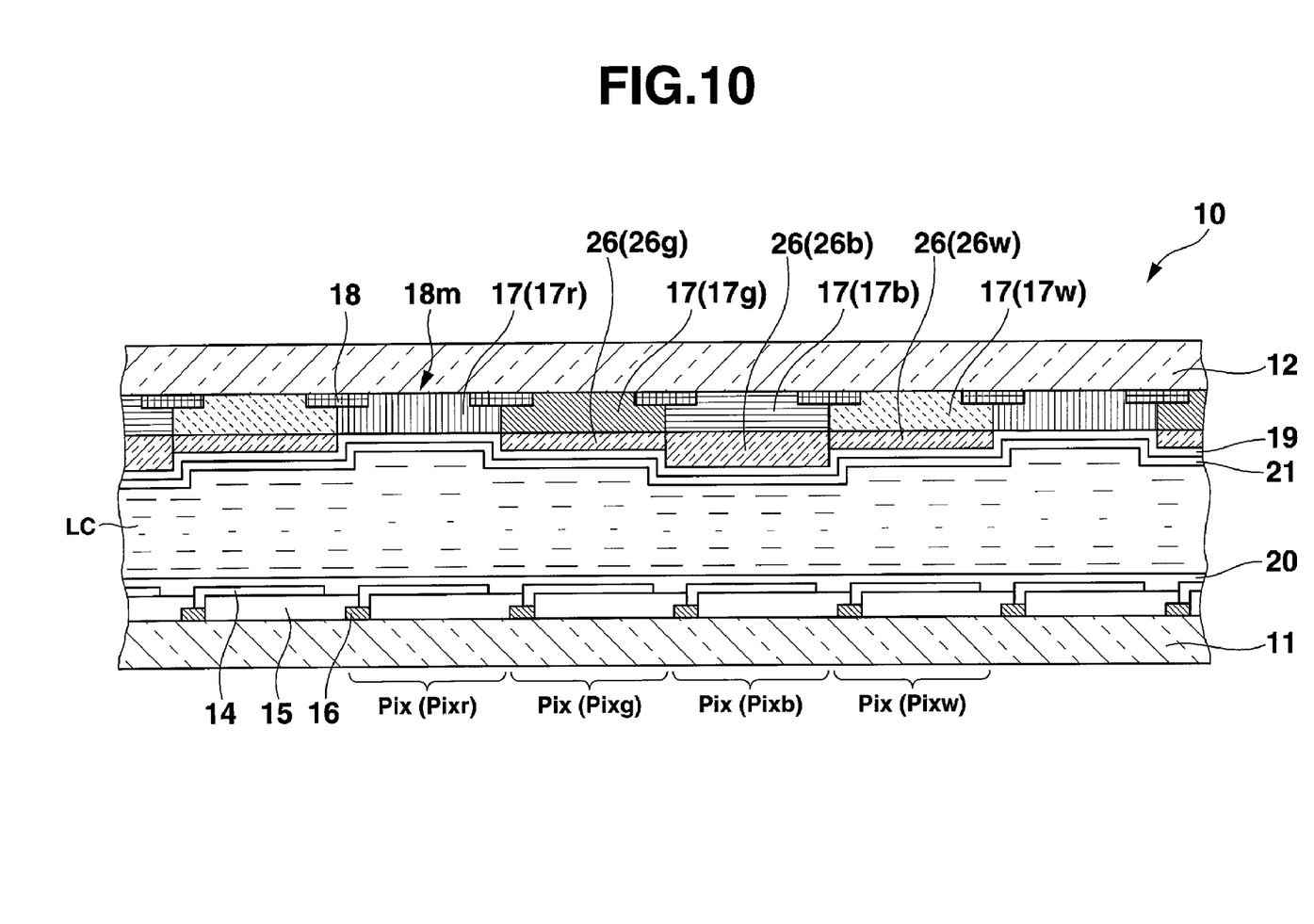
FIG. 10 is a cross-section view of an LCD apparatus according to an exemplary embodiment of the invention.

As a second exemplary variation of the above-described structures, as shown in FIG. 10, after forming the respective color filters 17 to the same thickness, transparent films 26 having various thicknesses are formed on the color filters. The transparent films 26 are not formed on the color filters of red components 17*r*, and the transparent films 26 are formed such that the thickness thereof becomes thicker in the ascending order of the transparent film 26*g* on the color filters of green component 17*g* and the transparent film 26*b* on the color filters of blue component 17*b*. It is preferable that the thickness of the transparent films 26*w* on the color filters of white component 17*w* be equal to that of the transparent films 26*g* on the color filters of green component 17*g* for the same reason as the first exemplary variation. In this case, because the transparent films 26g on the color filters of green component 17g and the transparent films 26w on the color filters of white component 17w can be formed in stripes at once, the increase in the number of major process steps required for the formation of the color filter substrate is limited to two. In addition, because the transparent films 26g, 26b and 26w on the color filters cannot be triply overlapped, the transparent films 26 on the color filters are not required to have cutout sections.

Figure 11:
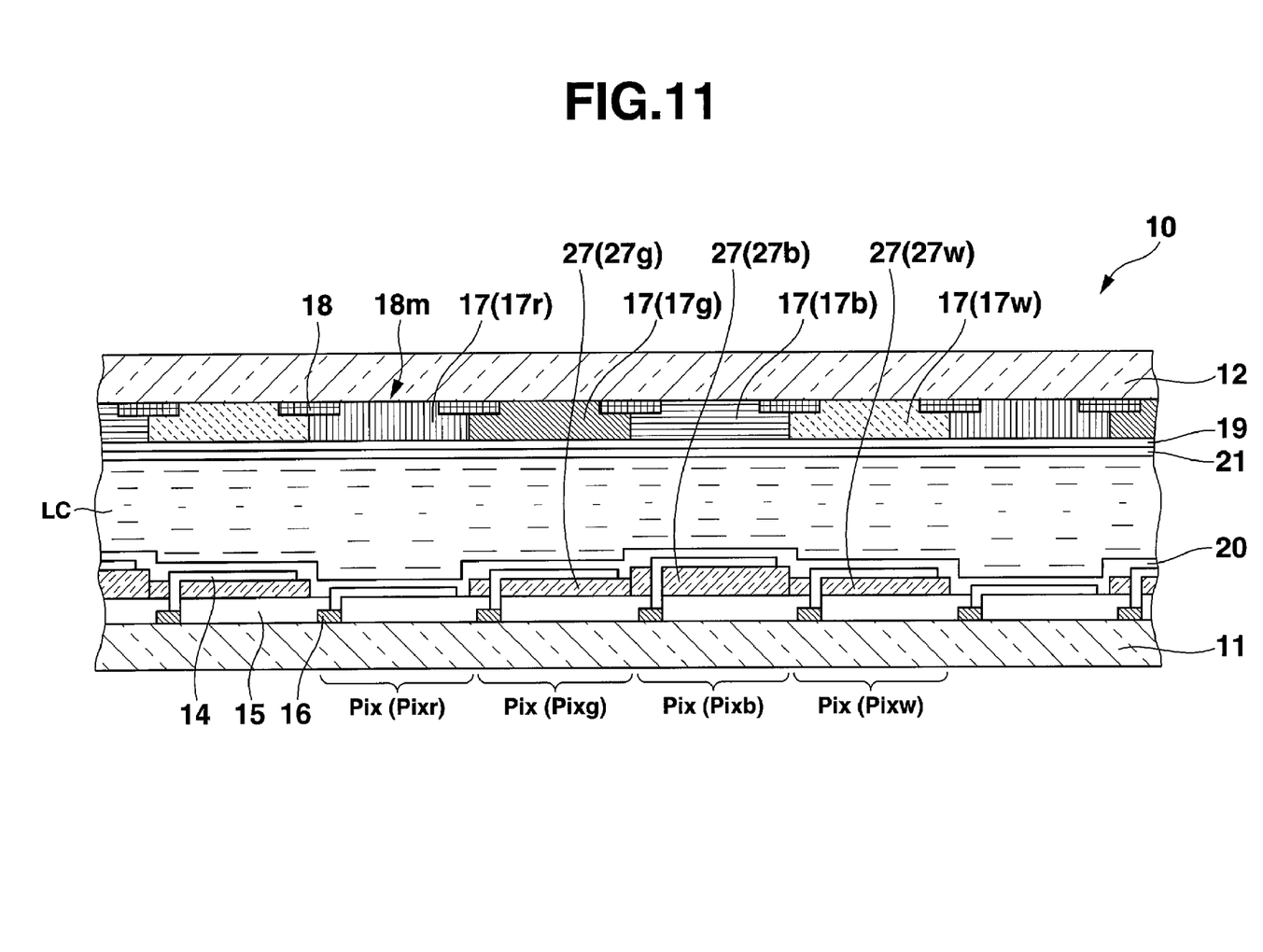
FIG. 11 is a cross-section view showing an LCD apparatus according to an exemplary embodiment of the invention.

As a third exemplary variation of the above-described structures, as shown in FIG. 11, transparent films 27 having various thicknesses are formed on the first substrate 11 (i.e., the TFT substrate). In this case, the thickness of the respective color filters 17 on the second substrate 12 is equal among the various color components. The transparent films 27 are not formed on surfaces opposite to the red color filters 17r, and the thickness of the transparent films 27 becomes thicker in the ascending order of the transparent films 27g opposite to the green color filters 17g and the transparent films 27b opposite to the blue color filters 17b. It is preferable that the thickness of the transparent films 27w opposite to the while color filters 17w be equal to that of the transparent films 27g for the same reason as the first exemplary variation. In this case, it is preferable that the transparent films 27 be formed on a layer lower than the pixel electrodes 14 (on a side opposite to the liquid crystal layer). In addition, because the transparent films 27g opposite to the green color filters 17g and the transparent film 27w opposite to the white color filters 17w can be formed in stripes at once, the increase in the number of major process steps required for the formation of the TFT substrate can be limited to two.

In the above-described embodiments, structures in which the light shielding film 18 and the color filters 17 are formed on the second substrate 12, which is different from the first substrate 11 on which the TFTs 16 are formed are described. Alternatively, the light shielding film 18 and the color filters 17 may be formed on the substrate on which TFTs 16 are formed. In such a case, it is preferable that the light shielding film 18 and the color filters 17 be formed on a side lower than the pixel electrodes 14 (on a side opposite to the liquid crystal layer).

Furthermore, in the above-described embodiments, the color filters for the color components are formed in the order of the blue component, the green component, the red component and the white component. However, the present invention is not limited to this order, but may be implemented with other arrangements/orders. Furthermore, when the color filters having the different thicknesses are formed, it is preferable that the color filters be formed in the order of the thinner to thicker color filters. This is because the thicker color filter (s) can be easily coated on the thinner color filter.

It will be apparent to those skilled in the art that various modification and variations can be made in the present invention without departing from the spirit or scope of the invention. Thus, it is intended that the present invention cover modifications and variations that come within the scope of the appended claims and their equivalents.

What is claimed is:

1. A liquid crystal display apparatus, comprising:
a plurality of color filters for four color components arranged in a matrix correspondingly to a plurality of pixels, respectively, every group of four color filters that are arranged adjacently to each other in a first direction and in a second direction that is perpendicular to said first direction being corresponding to different four color components,
wherein each of the plurality of color filters has an outer shape that has a cutout portion in each of four corners thereof,
wherein the liquid crystal display apparatus further comprises a light shielding film formed in a grid shape with a plurality of first lines extending in the first direction and a plurality of second lines extending in the second direction, the light shielding film shielding edge portions of each color filter,
wherein $Ps \geq Gs$, $Las = Bs - ((Ps-Gs)/2)$, and $Ps-Gs \leq 2 \cdot Bs$ are satisfied, where a pitch of the pixels in the first direction is defined as Ps, a maximum width of the color filters in the first direction is defined as Gs, a line width of the second lines is defined as Bs, and a maximum width of the cutout portions of each color filter in the first direction is defined as Las, and
wherein $Pd \geq Gd$, $Lad = Bd - ((Pd-Gd)/2)$, and $Pd-Gd \leq 2 \cdot Bd$ are satisfied, where a pitch of the pixels in the second direction is defined as Pd, a maximum width of the color filters in the second direction is defined as Gd, a line width of the first lines is defined as Bd, and a maximum width of the cutout portions of each color filter in the second direction is defined as Lad.

2. The apparatus according to claim 1, wherein a maximum width Las in the first direction of said cutout portions of each color filter is substantially equal to a line width Bs of said second lines.

3. The apparatus according to claim 2, wherein a maximum width Gs of the color filters in the first direction is substantially equal to a pitch Ps of the pixels in the first direction.

4. The apparatus according to claim 1, wherein a maximum width Lad in the second direction of said cutout portions of each color filter is substantially equal to a line width Bd of said first lines.

5. The apparatus according to claim 1, wherein a maximum width Gd of the color filters in the second direction is substantially equal to a pitch Pd of the pixels in the second direction.

6. The apparatus according to claim 1, wherein said four color components are respectively red, green, blue and white.

7. The apparatus according to 6, further comprising a liquid crystal layer under said plurality of color filters,
wherein a thickness of the liquid crystal layer under the color filter for red is greater than a thickness of the liquid crystal layer under the color filters for green, the thickness of the liquid crystal layer under the color filters for green is greater than a thickness of the liquid crystal layer under the color filters for blue, and a thickness of the liquid crystal layer under the color filters for white is substantially same as the thickness of the liquid crystal layer under the color filters for green.

8. The LCD apparatus according to 7, wherein a thickness of the color filters for red is smaller than a thickness of the color filters for green, the thickness of the color filters for green is smaller than a thickness of the color filters for blue, and a thickness of the color filters for white is substantially same as the thickness of the color filters for green.

9. The apparatus according to claim 7, further composing:
transparent film patterns respectively formed on the color filters for green, blue and white,
wherein a thickness of the transparent film pattern formed on the color filters for green is smaller than a thickness of the transparent film pattern formed on the color filters for blue, and a thickness of the transparent film pattern formed on the color filters for white is substantially same as the thickness of the transparent film pattern formed on the color filters for green.

10. A liquid crystal display apparatus, comprising:
a first color filter for a first color component disposed in a first pixel;
a second color filter for a second color component disposed in a second pixel that is located adjacent to the first pixel in a row direction;
a third color filter for a third color component disposed in a third pixel that is located adjacent to the first pixel in a column direction; and
a fourth color filter for a fourth color component disposed in a fourth pixel that is located adjacent to the second pixel in the column direction and adjacent to the third pixel in the row direction,
wherein the first color filter has a shape in which a corner adjacent both to the second pixel and to the third pixel is cut off from a pixel shape of the first pixel,
wherein the second color filter has a shape in which a corner adjacent both to the first pixel and to the fourth pixel is cut off from a pixel shape of the second pixel,
wherein the third color filter has a shape in which a corner adjacent both to the first pixel and to the fourth pixel is cut off from a pixel shape of the third pixel,
wherein the fourth color filter has a shape in which a corner adjacent both to the second pixel and to the third pixel is cut off from a pixel shape of the fourth pixel,
wherein the liquid crystal display apparatus further comprises a light shielding film formed in a grid shape with a plurality of first lines extending in the column direction and a plurality of second lines extending in the row direction, the light shielding film shielding edge portions of each color filter,
wherein $Ps \geq Gs$, $Las = Bs-((Ps-Gs)/2)$, and $Ps-Gs \leq 2 \cdot Bs$ are satisfied, where a pitch of the pixels in the column direction is defined as Ps, a maximum width of the color filters in the column direction is defined as Gs, a line width of the second lines is defined as Bs, and a maximum width of the cutout portions of each color filter in the column direction is defined as Las, and
wherein $Pd \geq Gd$, $Lad = Bd-((Pd-Gd)/2)$, and $Pd-Gd \leq 2 \cdot Bd$ are satisfied, where a pitch of the pixels in the row direction is defined as Pd, a maximum width of the color filters in the row direction is defined as Gd, a line width of the first lines is defined as Bd, and a maximum width of the cutout portions of each color filter in the row direction is defined as Lad.

11. The apparatus according to claim 10, wherein the first color component is red, the second color component is green, the third color component is blue, and the fourth color component is white.

12. A liquid crystal display apparatus, comprising:
a first color filter for a first color component disposed in a first pixel;
a second color filter for a second color component disposed on a second pixel that is located adjacent to the first pixel in a row direction;
a third color filter for a third color component disposed in a third pixel that is located adjacent to the first pixel in a column direction; and
a fourth color filter for a fourth color component located in a fourth pixel that is located adjacent to the second pixel in the column direction and adjacent to the third pixel in the row direction,
wherein the first through fourth color filters are shaped so as to leave an area surrounded by the first, second, third and fourth color filters that is unoccupied by any of the first through fourth color filters,
wherein the liquid crystal display apparatus further comprises a light shielding film formed in a grid shape with a plurality of first lines extending in the column direction and a plurality of second lines extending in the row direction, the light shielding film shielding edge portions of each color filter,
wherein $Ps \geq Gs$, $Las = Bs-((Ps-Gs)/2)$, and $Ps-Gs \leq 2 \cdot Bs$ are satisfied, where a pitch of the pixels in the column direction is defined as Ps, a maximum width of the color filters in the column direction is defined as Gs, a line width of the second lines is defined as Bs, and a maximum width of the cutout portions of each color filter in the column direction is defined as Las, and
wherein $Pd \geq Gd$, $Lad = Bd-((Pd-Gd)/2)$, and $Pd-Gd \leq 2 \cdot Bd$ are satisfied, where a pitch of the pixels in the row direction is defined as Pd, a maximum width of the color filters in the row direction is defined as Gd, a line width of the first lines is defined as Bd, and a maximum width of the cutout portions of each color filter in the row direction is defined as Lad.

13. The apparatus according to claim 12, wherein the first color component is red, the second color component is green, the third color component is blue, and the fourth color component is white.

14. The apparatus according to claim 12, further comprising:
a light shielding film shielding said area surrounded by the first through fourth color filters.

15. The liquid crystal display apparatus according to claim 1, wherein each of the plurality of color filters is formed by photolithography to have an outer shape that has a cutout portion in each of four corners thereof, the cutout portion being in a right triangle shape, a rectangular shape, or a quarter sector shape.

16. The liquid crystal display apparatus according to claim 10, wherein each of the color filters for each of the color components is formed by photolithography to have an outer shape that has a cutout portion in each of four corners thereof, the cutout portion being in a right triangle shape, a rectangular shape, or a quarter sector shape.

17. The liquid crystal display apparatus according to claim 14, wherein each of the color filters for each of the color components is formed by photolithography to have an outer shape that has a cutout portion in each of four corners thereof, the cutout portion being in a right triangle shape, a rectangular shape, or a quarter sector shape.

* * * * *